US008617510B2

(12) United States Patent  (10) Patent No.: US 8,617,510 B2
Im et al.  (45) Date of Patent: *Dec. 31, 2013

(54) POROUS METAL OXIDE AND METHOD OF PREPARING THE SAME

(75) Inventors: Dong-min Im, Yongin-si (KR); Yong-nam Ham, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/784,243

(22) Filed: May 20, 2010

(65) Prior Publication Data

US 2010/0264379 A1   Oct. 21, 2010

Related U.S. Application Data

(62) Division of application No. 11/607,409, filed on Dec. 1, 2006, now abandoned.

(30) Foreign Application Priority Data

Mar. 29, 2006 (KR) .................. 10-2006-0028395

(51) Int. Cl.
C01G 1/00 (2006.01)

(52) U.S. Cl.
USPC .............. 423/592.1; 423/593.1; 423/260; 423/263; 423/604; 423/605; 423/606; 423/607; 423/608; 423/610; 423/617; 423/618; 423/619; 423/624; 423/632; 423/594.17; 423/594.18; 423/594.19

(58) Field of Classification Search
USPC .......... 423/592.1, 593.1, 260, 263, 604–632, 423/594.17, 594.18, 594.19
See application file for complete search history.

(56) References Cited

U.S. PATENT DOCUMENTS

| | | | |
|---|---|---|---|
| 3,352,635 A * | 11/1967 | Machin et al. ............... | 423/604 |
| 4,499,201 A | 2/1985 | Leyerle | |
| 4,873,318 A | 10/1989 | Theodoropulos | |
| 5,741,947 A | 4/1998 | Wolf et al. | |
| 5,958,367 A | 9/1999 | Ying et al. | |
| 6,558,843 B1 | 5/2003 | Han et al. | |
| 6,558,847 B1 | 5/2003 | Kawakami et al. | |
| 6,585,948 B1 | 7/2003 | Ryoo et al. | |
| 6,689,716 B2 | 2/2004 | Sabacky et al. | |
| 6,812,187 B1 | 11/2004 | Pak et al. | |
| 6,846,410 B2 | 1/2005 | McNeff et al. | |
| 7,097,781 B2 | 8/2006 | Asakawa et al. | |
| 7,105,138 B2 | 9/2006 | Hur et al. | |
| 8,197,786 B2 * | 6/2012 | Im et al. ................ | 423/445 R |
| 2004/0047789 A1 | 3/2004 | Tietz et al. | |
| 2004/0092392 A1 | 5/2004 | Wang et al. | |
| 2005/0064731 A1* | 3/2005 | Park et al. ............ | 438/800 |
| 2006/0165995 A1* | 7/2006 | Im et al. ............... | 428/408 |
| 2006/0231525 A1 | 10/2006 | Asakawa et al. | |
| 2007/0013094 A1 | 1/2007 | Bischofsberger et al. | |
| 2009/0301902 A1 | 12/2009 | Gogotsi et al. | |

FOREIGN PATENT DOCUMENTS

| | | |
|---|---|---|
| CN | 1467159 A | 1/2004 |
| EP | 1683759 * | 7/2006 |
| JP | 57-209851 * | 12/1982 |
| JP | 09-503750 | 4/1997 |
| JP | 10-182161 | 7/1998 |
| JP | 2001-163617 * | 6/2001 |
| JP | 2001-220145 | 8/2001 |
| JP | 2003-077541 | 3/2003 |
| JP | 2004-517791 | 6/2004 |
| JP | 2004-196594 | 7/2004 |
| JP | 2005-537204 | 12/2005 |
| JP | 2006-188372 | 7/2006 |
| KR | 2001-0001127 | 1/2001 |
| KR | 10-2002-0088143 | 11/2002 |
| KR | 10-2004-009541 | 1/2004 |
| KR | 10-2005-0049202 | 5/2005 |
| KR | 10-2006-0015252 | 2/2006 |
| KR | 10-2006-0085163 | 7/2006 |
| KR | 10-0846477 | 7/2008 |
| WO | WO 2004/005184 A1 | 1/2004 |
| WO | WO 2004/101433 A3 | 11/2004 |

OTHER PUBLICATIONS

Translation of Japan 2001-163617, Jun. 2001.*
Translation of Japan 2002-362911, Tomoya Kubo et al., Dec. 2002.*
U.S. Notice of Allowance dated Dec. 23, 2010, for cross reference U.S. Appl. No. 11/852,009.
Oh, Gyu H., et al., *Preparation and Pore-Characteristics Control of Nano-Pourous Materials using Organometallic Building Blocks*, Carbon Science, Mar. 2003, vol. 4, No. 1, pp. 1-9.
KIPO Registration Determination Certificate dated Feb. 11, 2008, for Korean Patent application 10-2006-0086285.
SIPO Office action dated Jan. 26, 2011, for Chinese Patent application 200610163634.4, with English translation, 11 pages.
KIPO Office action dated Aug. 9, 2007, for Korean Patent application 10-2006-0086285, noting Korean references listed in this IDS.
SIPO Office action dated Aug. 12, 2010, for Chinese Patent application 200710149065.2, with English translation.
U.S. Office action dated Sep. 21, 2009 for related U.S. Appl. No. 11/607,409.
U.S. Office action dated Mar. 10, 2010 for related U.S. Appl. No. 11/607,409.
Korean Patent Abstracts, Publication No. 1020020088143 A, Published on Nov. 27, 2002, in the name of Han, et al.
Janiak, "Engineering coordination polymers towards applications" Dalton Trans., 2003, pp. 2781-2804.
James, "Metal-organic frameworks" Chem. Soc. Rev., 2003, 32, pp. 276-288.
SIPO Office action dated Oct. 9, 2009, for corresponding Chinese application 200610163634.4, noting listed Chinese reference in this IDS, as well as U.S. Patent 6,689,916 previously filed in an IDS dated Dec. 1, 2006.
Japanese Office action dated Jun. 5, 2012, for corresponding Japanese Patent application 2007-088910, (2 pages).

(Continued)

*Primary Examiner* — Steven Bos

(74) *Attorney, Agent, or Firm* — Christie, Parker & Hale, LLP

(57) ABSTRACT

Porous metal oxides are provided. The porous metal oxides are prepared by heat treating a coordination polymer. A method of preparing the porous metal oxide is also provided. According to the method, the shape of the particles of the metal oxide can be easily controlled, and the shape and distribution of pores of the porous metal oxide can be adjusted.

5 Claims, 14 Drawing Sheets

(56) References Cited

OTHER PUBLICATIONS

Patent Abstracts of Japan, and English machine translation of Japanese Publication 10-182161 listed above, (26 pages).
Patent Abstracts of Japan, and English machine translation of Japanese Publication 2006-188372 listed above, (26 pages).
Decision of Final Rejection of the Application issued Feb. 2, 2012 corresponding to Chinese Patent Application No. 200610163634.4, 4 pages and English Machine Translation 6 pages.
U.S. Notice of Allowance dated Feb. 15, 2012 for cross-reference application U.S. Appl. No. 11/852,009, 10 pages.
SIPO Office action dated Mar. 29, 2012, for corresponding Chinese Patent application 200710149065.2, with English translation (15 pages).
Patent Abstracts of Japan, and English machine translation of Japanese Publication 2003-077541 listed above, (17 pages).

* cited by examiner

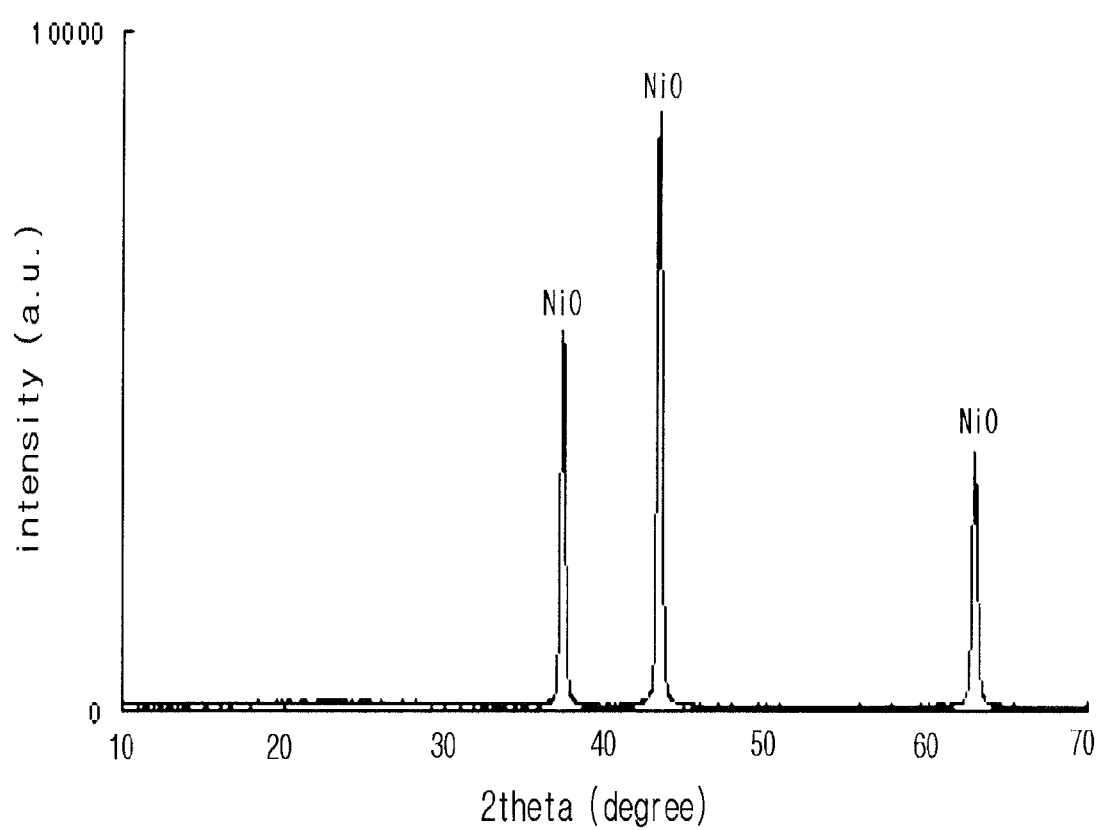

US 8,617,510 B2

POROUS METAL OXIDE AND METHOD OF PREPARING THE SAME

CROSS-REFERENCE TO RELATED PATENT APPLICATION

This application is a divisional of U.S. patent application Ser. No. 11/607,409, filed Dec. 1, 2006, which claims priority to and the benefit of Korean Patent Application No. 10-2006-0028395 filed on Mar. 29, 2006 in the Korean Intellectual Property Office, the entire contents of both of which are incorporated herein by reference.

BACKGROUND OF THE INVENTION

1. Field of the Invention

The present invention relates to a porous metal oxide and a method of preparing the same, and more particularly, to a porous metal oxide having a particle shape that can be easily-controlled and pores having an adjustable shape and distribution, and a method of preparing the same.

2. Description of the Related Art

Porous metal oxides are used as electrode materials in the energy field. In general, electrode materials must have good electronic conductivity and good ionic conductivity, while ionic conductivity is typically lower than electronic conductivity. However, in porous electrode materials, ions can be delivered to the inside of the particles of the porous metal oxide, thereby reducing the distance that ions travel. Nano-materials may have similar effects as porous electrode materials, but have high contact resistance between the particles of the nano-materials and it is difficult to manufacture electrodes formed of nano-materials. Therefore, practical application of nano-materials is difficult.

Examples of porous metal oxides used as electrode materials include $MnO_2$, $LiCoO_2$, $LiNiO_2$, $LiCO_{1/3}Ni_{1/3}Mn_{1/3}O_2$ which are used as cathode materials for lithium secondary batteries. In electrochemical capacitors, $RuO_2$, $NiO$, etc. are used as pseudocapacitance materials. Porous metal oxides can also be used as electrode materials for solid oxide fuel cells (nickel oxide or cobalt oxide), molten carbonate fuel cells, borohydride fuel cells, or dye sensitized solar cells (titanium oxide).

Such porous metal oxides are typically prepared by a sintering method or a template method. Sintering is most frequently used to prepare porous metal oxides. It is difficult to prepare porous metal oxides in the form of a powder. To form the porous metal oxide in a predetermined shape, pressure molding can be performed.

A template method is frequently used for preparing porous materials having mesopores with a diameter of 50 nm or less. However, processing costs of the template method are high and mass production is difficult.

SUMMARY OF THE INVENTION

In one embodiment of the present invention, a method of preparing a porous metal oxide is provided in which particles of the porous metal oxide can be easily controlled and the shape and distribution of pores can be adjusted.

In another embodiment of the present invention, a porous metal oxide is prepared by the above-described method.

According to one embodiment of the present invention, a method of preparing a porous metal oxide comprises heat treating a coordination polymer. The heat treatment may comprise a first heat treatment process conducted under an inert atmosphere and a second heat treatment process conducted under an oxygen-containing atmosphere. The temperature for the first heat treatment process may range from about 300° C. to the melting point of the main metal included in the coordination polymer.

The coordination polymer may be a compound having a unit structure represented by Formula 1 below:

$$M_xL_yS_z \qquad \text{Formula 1}$$

In Formula 1, M is a metal selected from transition metals, Group 13 metals, Group 14 metals, Group 15 metals, lanthanides, actinides and combinations thereof. L is a multi-dentate ligand that simultaneously forms ionic or covalent bonds with at least two metal ions. S is a mono-dentate ligand that forms an ionic or covalent bond with one metal ion. When d is the number of L's functional groups that can bind to metal ions, x, y and z are integers satisfying the equation $yd+z \leq 6x$.

According to another embodiment of the present invention, a porous metal oxide has a multilateral shape and has pores with an average diameter of about 10 nm or greater. In one embodiment, for example, the average diameter of the pores ranges from about 20 to about 100 nm.

According to one embodiment, the particles of the porous metal oxide may be needle-shaped or plate-shaped.

BRIEF DESCRIPTION OF THE DRAWINGS

The above and other features and advantages of the present invention will become more apparent by reference to the following detailed description when considered in conjunction with the attached drawings in which:

FIG. 4 is an X-ray diffraction (XRD) graph of the porous nickel oxide prepared according to Example 1;

DETAILED DESCRIPTION OF THE INVENTION

Figure 1:
FIG. 1 is a scanning electron microscope (SEM) image of the coordination polymer prepared according to Example 1.

The present invention will now be described with reference to the accompanying drawings, in which exemplary embodiments of the invention are shown.

A porous metal oxide according to one embodiment of the present invention has a multilateral shape and an average pore diameter of about 10 nm or greater. The porous metal oxide can be prepared by heat-treating a coordination polymer. The shape of the oxide, and the size and shape of the pores of the porous metal oxide can be controlled. Using the coordination polymer is a new approach to the synthesis of composites. The coordination polymer has a repeating unit with a one-, two-, or three-dimensional morphology as compared to a general coordination compound which is represented by Formula 2:

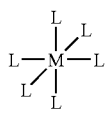

Formula 2

Nonlimiting examples of two-dimensional coordination polymers include compounds represented by Formula 3:

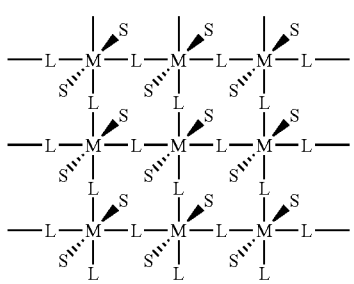

Formula 3

In Formula 3, where M, L and S are as defined below.

In the two-dimensional coordination polymers represented by Formula 3, four ligands (L) having multiple functional groups ("multi-dentate ligands") and two mono-dentate ligands (S) coordinate to a metal (M) atom. The multi-dentate ligands (L) also coordinate to other adjacent metal (M) atoms. In this embodiment, the metal (M) atoms act as coordination sites for the ligands in the same manner as in the general coordination compound represented by Formula 2. However, the ligands of the two-dimensional coordination polymer represented by Formula 3 coordinate to multiple metal atoms at the same time. Multi-dentate ligands (in which one ligand coordinates to two metals at the same time) form a coordination polymer having a very regular lattice structure. Such a structure can be extended to a three-dimensional structure because, unlike in a planar-type coordination polymer, the multi-dentate ligands shown in Formula 3 can further coordinate to metal atoms or ligands located above or below them to form a three-dimensional coordination polymer.

The coordination polymer used to form a carbon-metal composite according to one embodiment of the present invention may be a compound represented by Formula 1:

$$M_x L_y S_z \quad (1)$$

In formula 1, M is a metal selected from transition metals, Group 13 metals, Group 14 metals, Group 15 metals, lanthanides, actinides and combinations thereof. L is a multi-dentate ligand that simultaneously forms ionic or covalent bonds with at least two metal ions. S is a mono-dentate ligand that forms an ionic or covalent bond with one metal ion. When d is the number of functional groups of L that can bind to the metal ion x, y and z are integers satisfying the equation yd+z≤6x.

In the coordination polymers represented by Formula 1, the multi-dentate ligand L links metal atoms or ions to form a network structure. Thus, the compound of Formula 1 is primarily crystalline. Such a coordination polymer may optionally include a mono-dentate ligand S which can bind to a metal atom or ion irrespective of the multi-dentate ligand L.

The structure of the coordination polymer according to this embodiment is different from that of a chelate compound. A chelate compound is a general compound in which a multi-dentate ligand binds to a metal ion, and has a different structure from the coordination polymer of the present embodiment. That is, in a chelate compound, for example, a multi-dentate ligand such as ethylene diamine coordinates to a metal ion, but does not form a network structure as in the coordination polymer of the present embodiment. Rather, a single coordination compound in which the multi-dentate ligand forms a chelate ring is obtained. In the coordination polymer of the present embodiment, neighboring metals are linked to each other via multi-dentate ligands to form a network structure. In contrast, in the chelate compound, multi-dentate ligands coordinate to only one metal ion at multiple sites, and thus, do not form a network structure.

When a network structure is formed via multi-dentate ligands L, core metal ions or atoms can form coordination bonds not only with multi-dentate ligands L, but may also bind to mono-dentate ligands S if necessary. The mono-dentate ligands S may be any ligands used in general coordination compounds, for example, ligands containing N, O, S, P, As, etc. having lone pair electrons. Nonlimiting examples of suitable mono-dentate ligands include $H_2O$, $SCN^-$, $CN^-$, $Cl^-$, $Br^-$, $NH_3$ and the like. However, the mono-dentate ligands S can also have multiple functional groups. In addition, when a chelate ring is formed, a multi-dentate ligand L can be used. That is, although multi-dentate ligands L such as bi-dentate ligands, tri-dentate ligands, tetra-dentate ligands, etc. can be used, if metal atoms or ions can form a network structure through mono-dentate ligands S, mono-dentate ligands S can also be used.

A multi-dentate ligand L capable of linking metal ions or atoms to form a network may be any ligand having at least two functional groups capable of forming covalent or ionic bonds with the core metal to form a network structure. In particular, the multi-dentate ligand L of the present embodiment is distinguishable from a multi-dentate ligand L coordinating to only one metal ion to form a chelate ring (chelate ligand) as described above. This is because it is difficult to form a coordination polymer having a network structure with a chelate ligand.

Nonlimiting examples of suitable multi-dentate ligands L include trimesate-based ligands represented by Formula 4, terephthalate-based ligands represented by Formula 5, 4,4'-bipyridine-based ligands represented by Formula 6, 2,6-naphthalenedicarboxylate-based ligands represented by Formula 7 and pyrazine-based ligands represented by Formula 8:

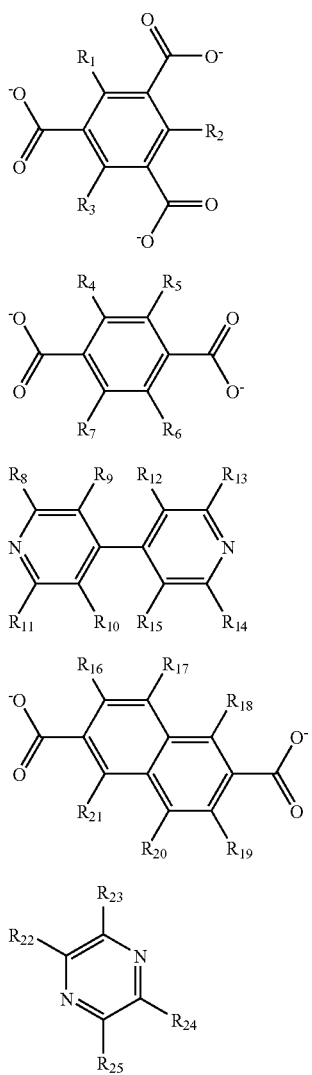

Formula 4

Formula 5

Formula 6

Formula 7

Formula 8

In formulae 4 to 8, $R_1$ through $R_{25}$ are each independently selected from hydrogen atoms, halogen atoms, hydroxy groups, substituted $C_{1-20}$ alkyl groups, unsubstituted $C_{1-20}$ alkyl groups, substituted $C_{1-20}$ alkoxy groups, unsubstituted $C_{1-20}$ alkoxy groups, substituted $C_{2-20}$ alkenyl groups, unsubstituted $C_{2-20}$ alkenyl groups, substituted $C_{6-30}$ aryl groups, unsubstituted $C_{6-30}$ aryl groups, substituted $C_{6-30}$ aryloxy groups, unsubstituted $C_{6-30}$ aryloxy groups, substituted $C_{2-30}$ heteroaryl groups, unsubstituted $C_{2-30}$ heteroaryl groups, substituted $C_{2-30}$ heteroaryloxy groups, and unsubstituted $C_{2-30}$ heteroaryloxy groups.

The multi-dentate ligands L are described in more detail in Chistoph Janiak, *Dalton Trans.*, 2003, p 2781-2804, and Stuart L. James, *Chem. Soc. Rev.*, 2003, 32, 276-288, the entire contents of which are incorporated herein by reference.

The metal bound to the multi-dentate ligands L to form the coordination polymer is not limited as long as it can provide coordination sites for the multi-dentate ligands L. Nonlimiting examples of suitable metals include transition metals, Group 13 metals, Group 14 metals, Group 15 metals, lanthanides, actinides and combinations thereof. For example, Fe, Pt, Co, Cd, Cu, Ti, V, Cr, Mn, Ni, Ag, Pd, Ru, Mo, Zr, Nb, La, In, Sn, Pb, Bi, etc. can be used.

In Formula 1, x, y and z are integers satisfying the equation $yd+z \leq 6x$, where d denotes the number of functional groups of the multi-dentate ligand L which can bind to the metal. For example, when L is a tetra-dentate ligand and two mono-dentate ligands S coordinate to the metal, the coordination polymer has a basic structure of $MLS_2$ and satisfies the equation $1(y) \times 4(d) + 2(z) = 6(x)$. Since the multi-dentate ligand L is essential to form a network, y is at least 1. Also, since the mono-dentate ligand S is an optional element, z is at least 0. It will be understood by those skilled in the art that x, y and z do not represent the specific number of atoms but they indicate ratios of metals and ligands in view of the nature of polymers. When a core metal M is Cd and the multi-dentate ligand L is 4,4'-bipyridine, the coordination polymer of the present embodiment is a compound represented by Formula 9 (where x is 1, and y and z are 2):

Formula 9

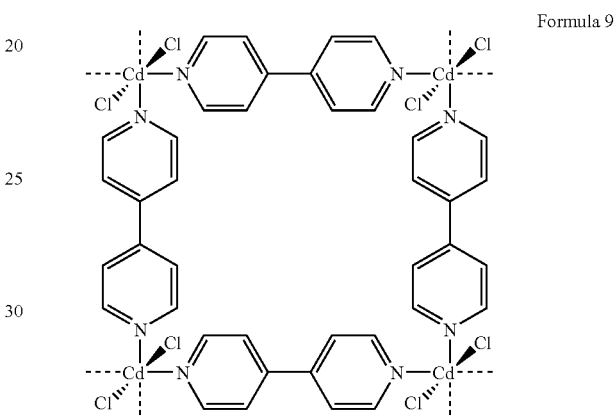

In the coordination polymer of Formula 9, 4,4'-bipyridine coordinates to Cd, the core metal M. Specifically, a terminal nitrogen atom of 4,4'-bipyridine binds to a Cd ion and another terminal nitrogen atom of 4,4'-bipyridine binds to another Cd ion. This binding pattern is repeated to form a network, thereby obtaining a coordination polymer having a two-dimensional lattice structure. Such a coordination polymer structure affects the final shape, for example, periodicity, etc. of a carbon-metal composite obtained by heat-treating the coordination polymer. Thus, when the process of forming the coordination polymer is properly controlled, the shape of the final product can be controlled. The crystalline shape of the coordination polymer can be controlled by properly modifying the reaction temperature, pH and reaction time for the metal precursor and ligands to bind to each other. The shape may also be controlled by modifying the type of metal, the type of ligand and the concentrations thereof, or by properly controlling the drying temperature and drying time to obtain the coordination polymer in a crystalline state.

As described above, a porous metal oxide according to one embodiment of the present invention is obtained by heat-treating a coordination polymer. The heat treatment may include a first heat treatment process conducted under an inert atmosphere and a second heat treatment process conducted under an oxygen-containing atmosphere. Alternatively, the heat treatment may be performed in a single operation either under an inert atmosphere or under an oxygen-containing atmosphere to prepare the porous metal oxide.

The first and second heat treatment processes are performed as follows. First, a carbon-metal nano-composite is formed during the first heat treatment process under an inert atmosphere. Then carbon is removed and metal is oxidized during the second heat treatment process under an oxygen-containing atmosphere to form the porous metal oxide.

The first heat treatment process under an inert atmosphere may be performed at a temperature ranging from about 300° C. to about the melting point of the corresponding metal. In one embodiment, for example, the first heat treatment process is performed at a temperature ranging from about 500° C. to about the melting point of the corresponding metal. The period of time that the first heat treatment process is performed is not particularly limited. However, in one embodiment, the first heat treatment process is performed for a period of time ranging from about 0.1 to about 10 hours. For example, the first heat treatment process may be performed for a period of time ranging from about 0.5 to about. 3 hours. When the temperature of the first heat treatment process is less than about 300° C., carbonization is not sufficient. When the temperature of the first heat treatment process is greater than about the melting point of the corresponding metal, the structure of the nano-composite itself is likely to collapse due to the melting and aggregation of metal particles. When the first heat treatment process is performed for a period of time less than about 0.1 hours, the effect of the heat treatment is insufficient. When the first heat treatment process is performed for a period of time greater than about 10 hours, the heat treatment is not economical.

When the coordination polymer is subjected to the first heat treatment process as described above, the volatile and combustible parts are mostly vaporized and removed. Thus, the shape of the carbon-metal composite remains unchanged and has a reduced volume after the first heat treatment process. Since the shape of the coordination polymer is maintained even after the first heat treatment process, the shape of the final product can be easily controlled, as indicated above.

The second heat treatment process conducted under an oxygen-containing atmosphere may be performed at a temperature ranging from about 300 to about 1500° C. In one embodiment, for example, the second heat treatment process is performed at a temperature ranging from about 300 to about 800° C. The period of time that the second heat treatment process is performed is not particularly limited. However, in one embodiment, the second heat treatment process is performed for a period of time ranging from about 0.1 to about 24 hours. For example, the second heat treatment process may be performed for a period of time ranging from about 0.5 to about 5 hours. When the temperature of the second heat treatment process is less than about 300° C., oxidation of carbon is difficult and thus it is difficult to remove carbon from the carbon-metal composite. When the temperature of the second heat treatment process is greater than about 1500° C., sintering is performed at the high temperature and the shape of the pores collapses.

The carbon-metal composite prepared using the first heat treatment process under an inert atmosphere may have a specified periodicity. Such periodicity is due to the repeating unit having a one-, two-, or three-dimensional morphology, and denotes that the repeated high regularity of the coordination polymer is maintained after heat treatment. Such periodicity can be measured by X-ray diffraction analysis of the carbon-metal composite obtained after the first heat treatment process, and at least one peak is present at d-spacings of 6 nm or greater. Such periodicity affects the properties of the porous metal oxide prepared from the carbon-metal composite and thus a metal oxide having uniformly arranged pores with an average diameter of about 10 nm or greater can be achieved. In one embodiment, pores having an average diameter ranging from about 20 to about 100 nm can be achieved. Such a porous metal oxide having pores with an average diameter greater than about 10 nm is difficult to obtain using only a structure directing agent.

Since the shape of the particles of the porous metal oxide according to this embodiment of the present invention can be easily controlled, the final particle shape can be easily controlled by appropriate selection of the coordination polymer or the heat treatment conditions. In one embodiment, needle-shaped or plate-shaped porous metal oxide particles are obtained.

In the porous metal oxide according to this embodiment of the present invention, the coordination polymer forming the porous metal oxide can be synthesized mostly in an aqueous state, which is both economical and highly stable. Furthermore, simple heat treatment processes suggest that mass production is easy, and no template is required. Also, various shapes of the desired porous metal oxide can be easily controlled according to the desired use by controlling the shape of the coordination polymer. Moreover, the porous metal oxide is prepared by heat treating the uniform carbon-metal nano-composites in which the carbon portion and the metal portion are periodically repeated, thereby obtaining an appropriate diameter and distribution of pores and causing ions and gas to flow more easily. Consequently, the porous metal oxide provides excellent high rate performance in electrochemical devices and can be efficiently used in catalysts, catalyst supports, electrode materials for secondary batteries, fuel cells, or electric double layer capacitors.

Hereinafter, the present invention will be described with reference to the following examples. However, these examples are provided for illustrative purposes only and do not limit the scope of the invention.

Example 1

37.33 g of nickel (II) acetate tetrahydrate and 19.96 g of trimesic acid were added to 500 ml of distilled water and stirred at 55° C. for 2 hours. Powders produced in the solution were removed using a nylon filter, washed with distilled water several times, and then dried in an oven at 80° C. for 12 hours to obtain a crystalline coordination polymer. FIG. 1 is a scanning electron microscope (SEM) image of the crystalline coordination polymer prepared according to this example.

Figure 2:
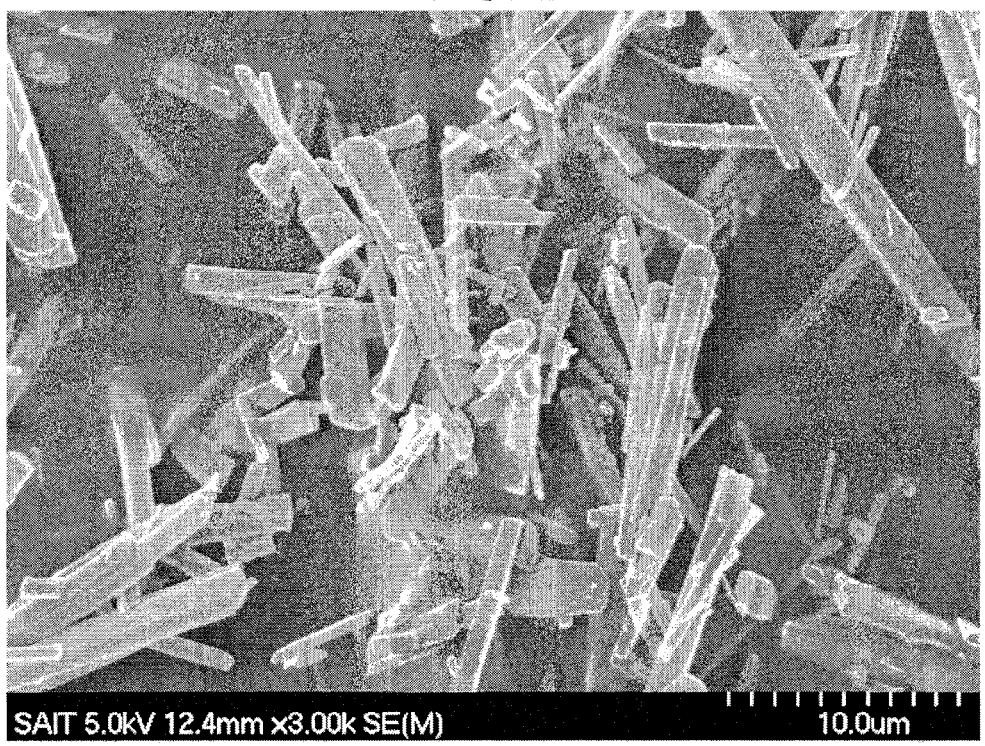
FIG. 2 is a SEM image of the carbon-nickel composite prepared according to Example 1.

The obtained crystalline coordination polymer was subjected to heat treatment under an Ar atmosphere at 600° C. for 1 hour to prepare a carbon-nickel composite having the same shape as the untreated crystalline coordination polymer and a reduced volume. FIG. 2 is a SEM image of the obtained carbon-metal composite.

Figure 3A:
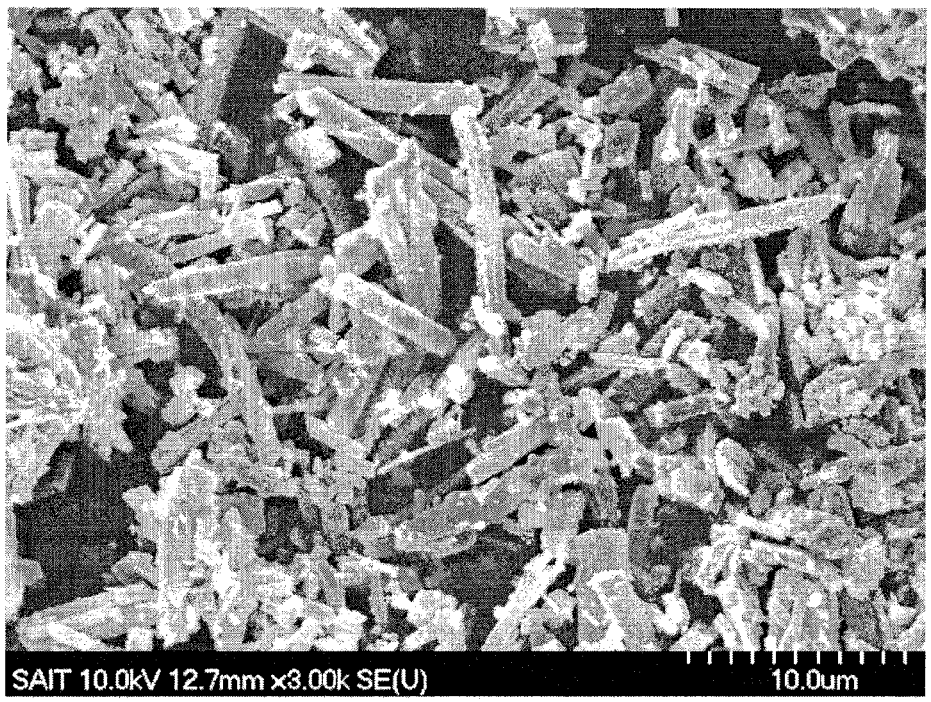
FIGS. 3A and 3B are SEM images of the porous nickel oxide prepared according to Example 1.
Figure 3B:
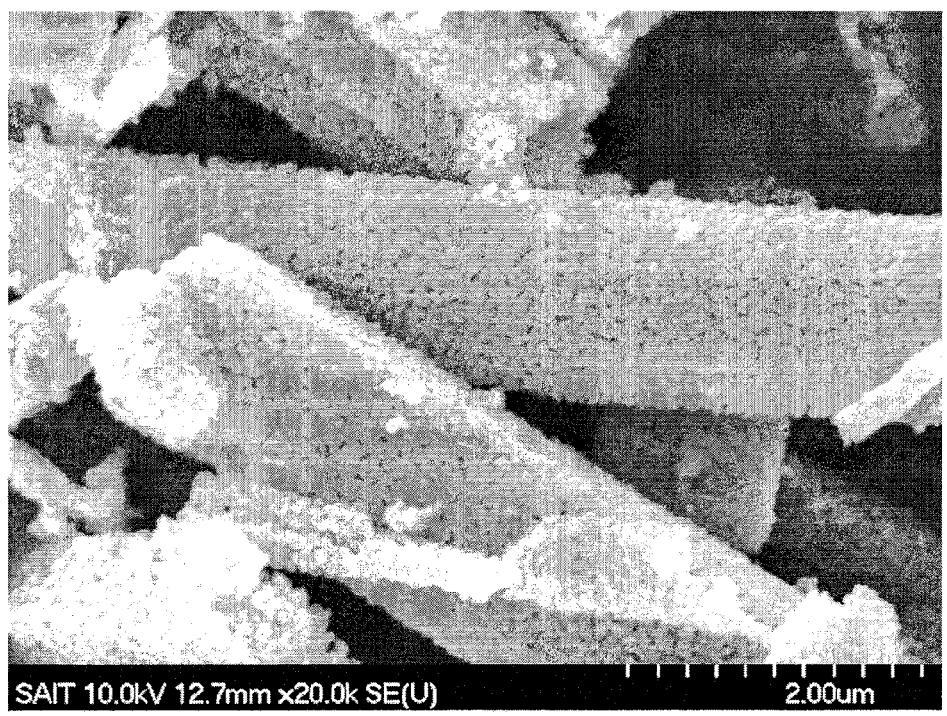
Figure 5:
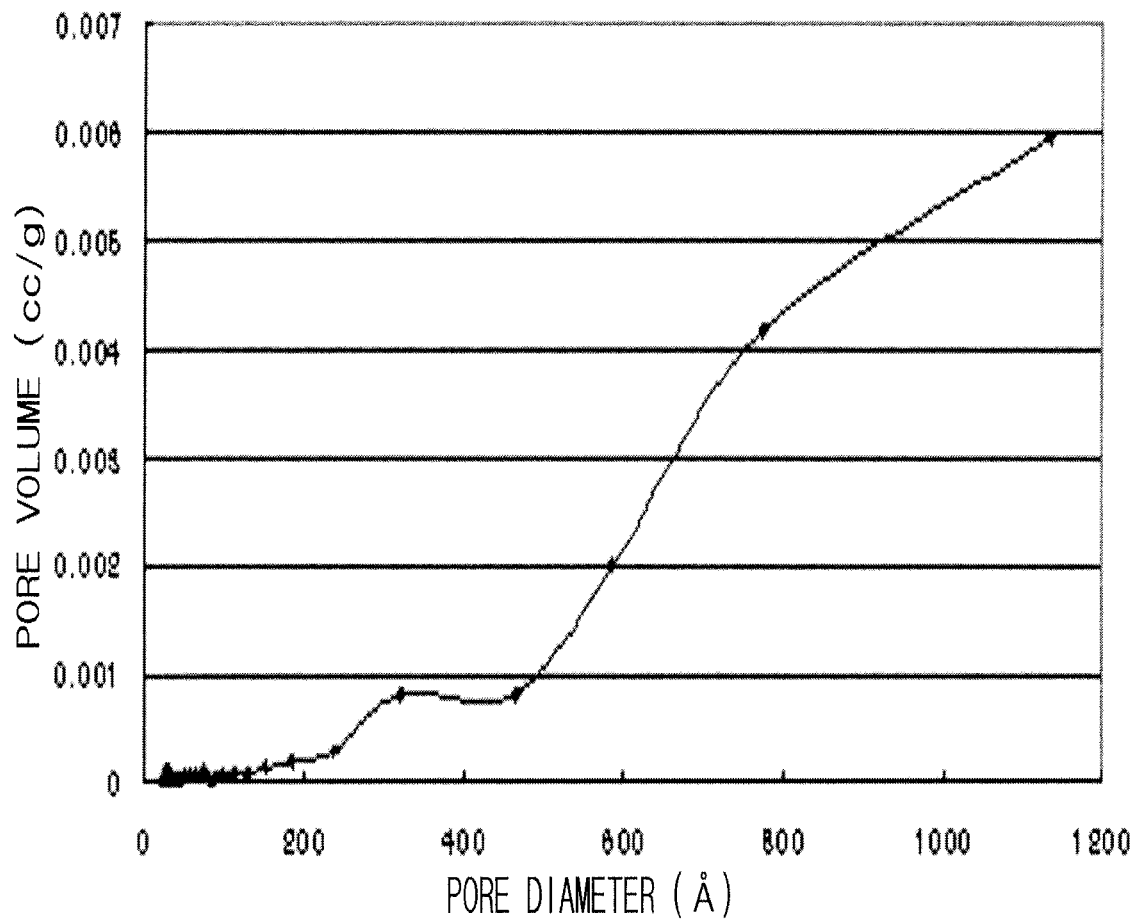
FIG. 5 is a graph illustrating the nitrogen adsorption of the porous nickel oxide prepared according to Example 1.

FIGS. 3A and 3B are SEM images of a porous nickel oxide obtained by heat treating the obtained carbon-nickel composite in air at 700° C. for 1 hour. FIGS. 3A and 3B show that the oxide powder is porous and that the particle shape of the oxide powder is maintained. FIG. 4 is an XRD graph of the obtained porous nickel oxide, indicating that a pure NiO material is formed. The porous nickel oxide was analyzed using a nitrogen adsorption method. The pore diameter distribution was analyzed using a BJH adsorption method and is illustrated in FIG. 5. As shown in FIG. 5, the pore diameters were mainly 20 nm or greater.

Examples 2 through 5

Synthesis of the coordination polymer and heat treatment were performed as in Example 1, except that the heat treatment temperature for forming the carbon-metal composite was adjusted from 700 to 1000° C. as listed in Table 1 below.

TABLE 1

| Sample | Precursor | Heat treatment temperature (°C.) | |
| --- | --- | --- | --- |
| | | First heat treatment (Argon) | Second heat treatment (Air) |
| Example 2 | Nickel(II) trimesate | 700 | 700 |
| Example 3 | Nickel(II) trimesate | 800 | 700 |
| Example 4 | Nickel(II) trimesate | 900 | 700 |
| Example 5 | Nickel(II) trimesate | 1000 | 700 |

Figure 6A:
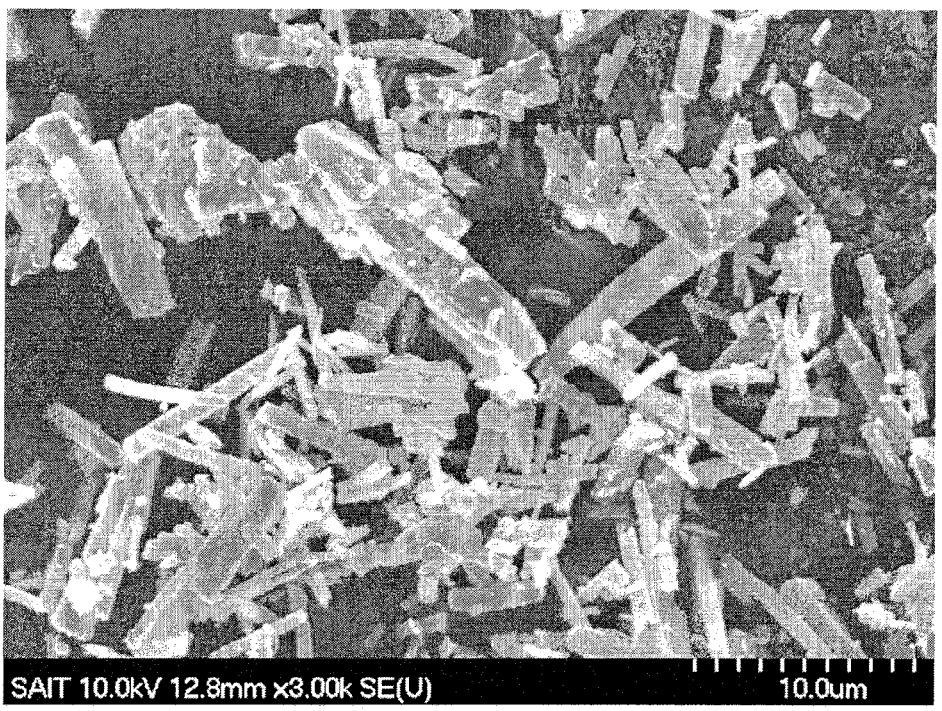
FIGS. 6A and 6B are SEM images of the porous nickel oxide prepared according to Example 2.
Figure 6B:
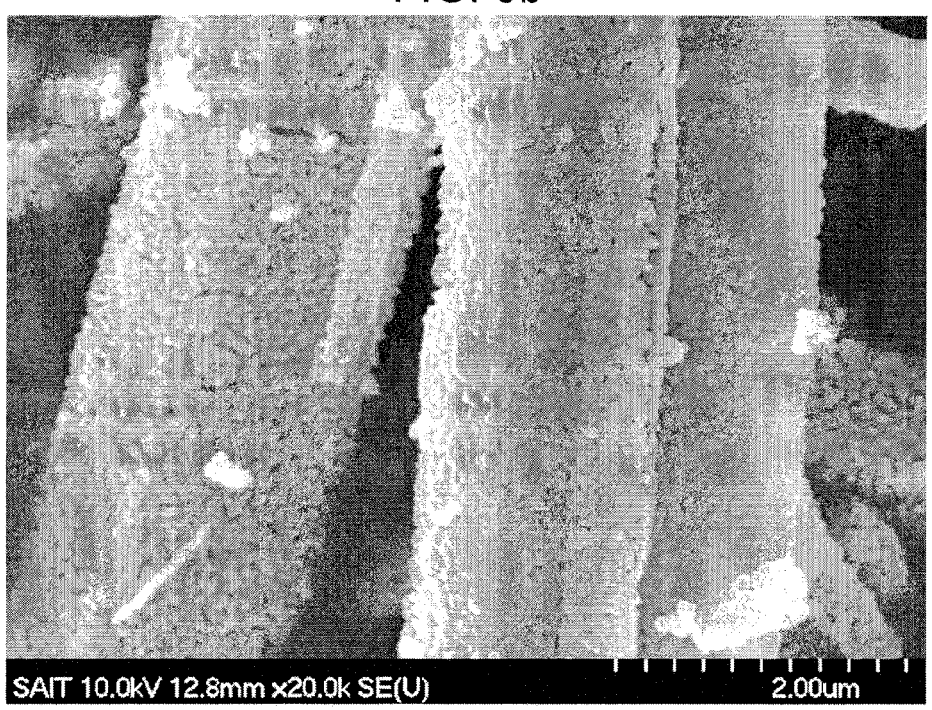
Figure 7A:
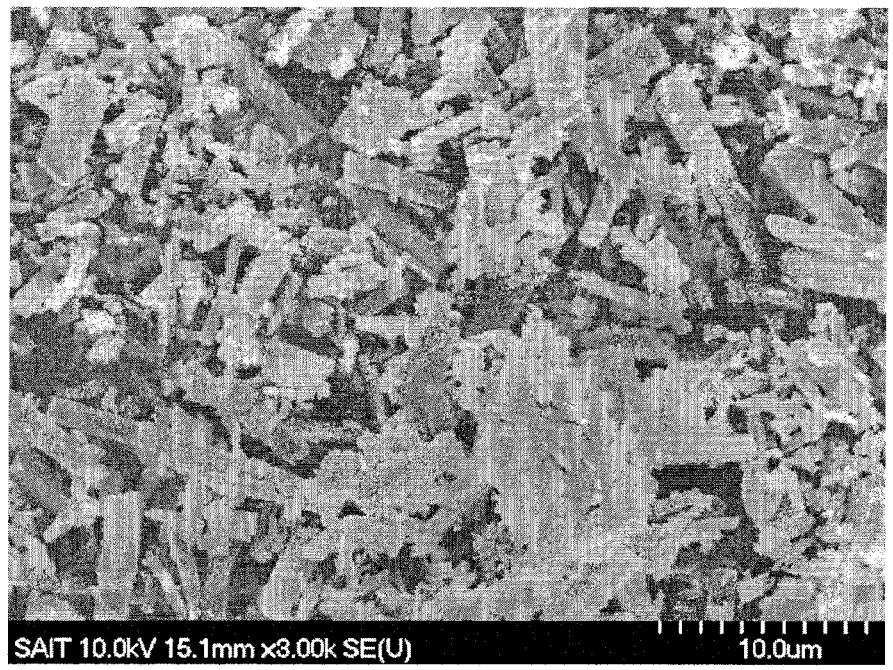
FIGS. 7A and 7B are SEM images of the porous nickel oxide prepared according to Example 3.
Figure 7B:
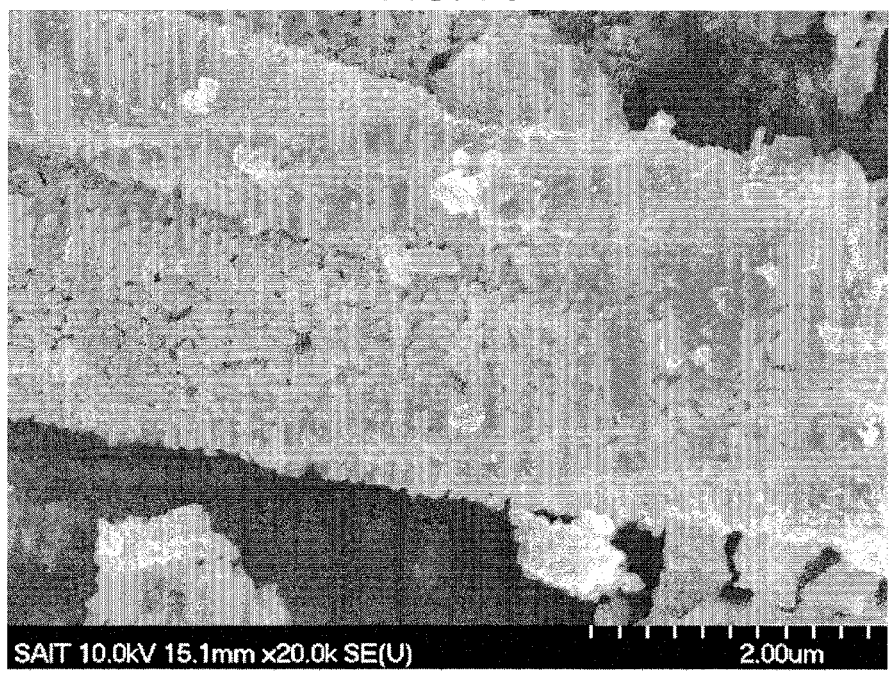
Figure 8A:
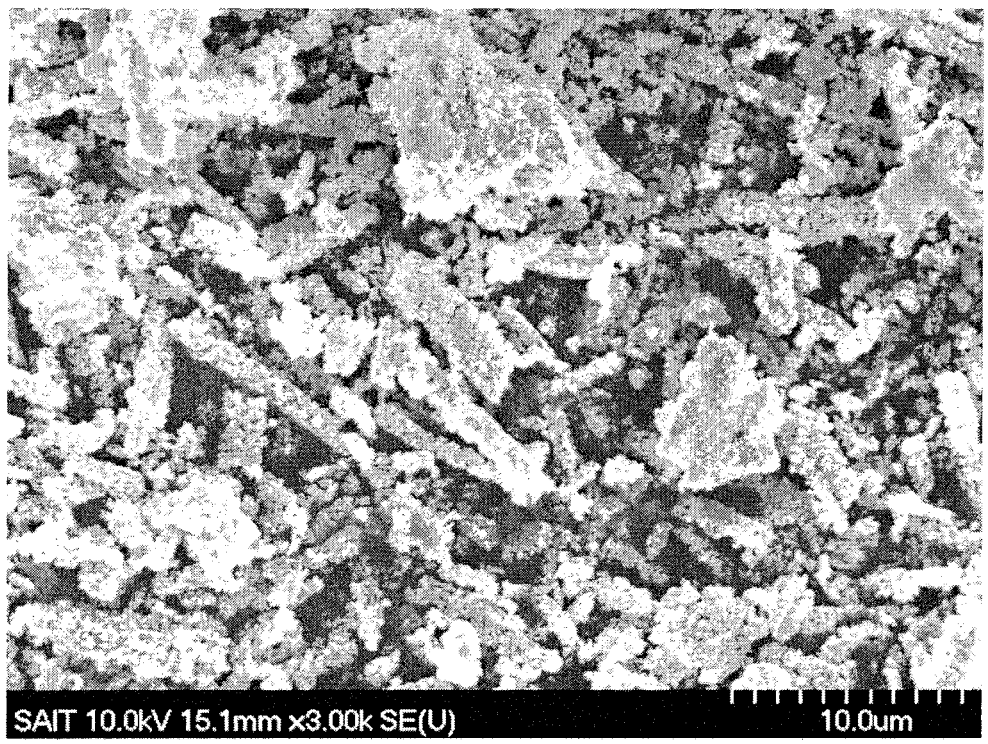
FIGS. 8A and 8B are SEM images of the porous nickel oxide prepared according to Example 4.
Figure 8B:
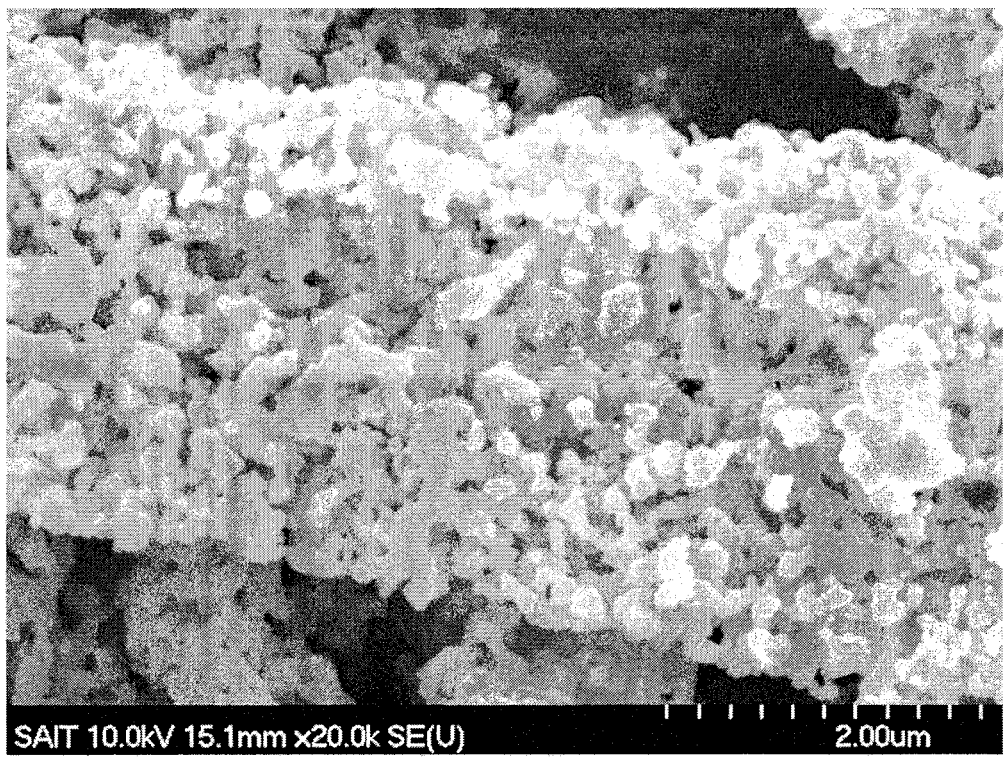
Figure 9A:
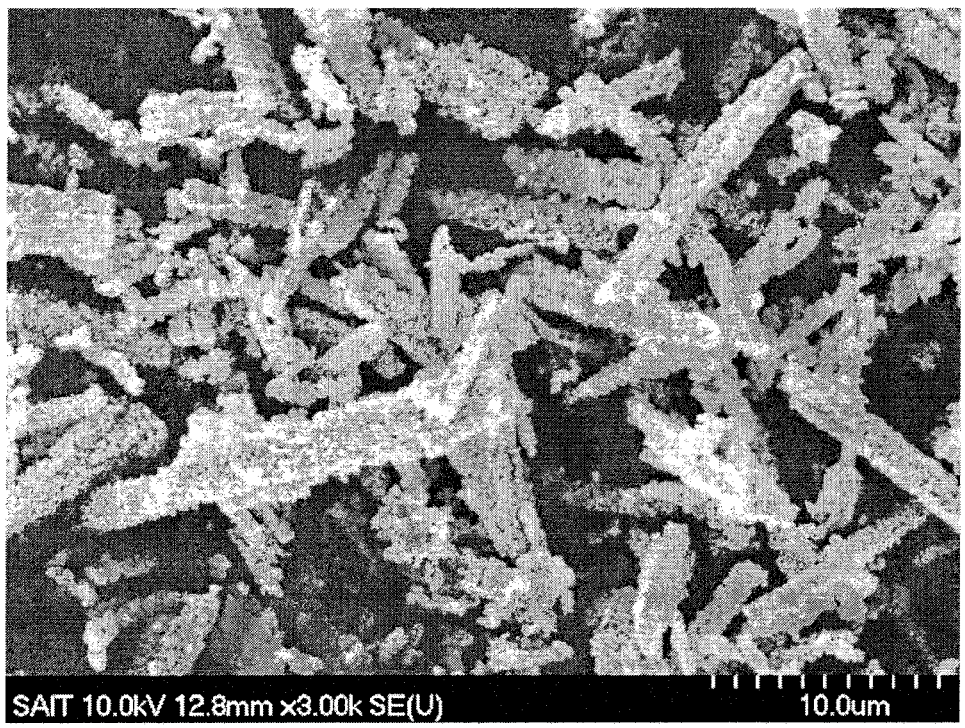
FIGS. 9A and 9B are SEM images of the porous nickel oxide prepared according to Example 5.
Figure 9B:
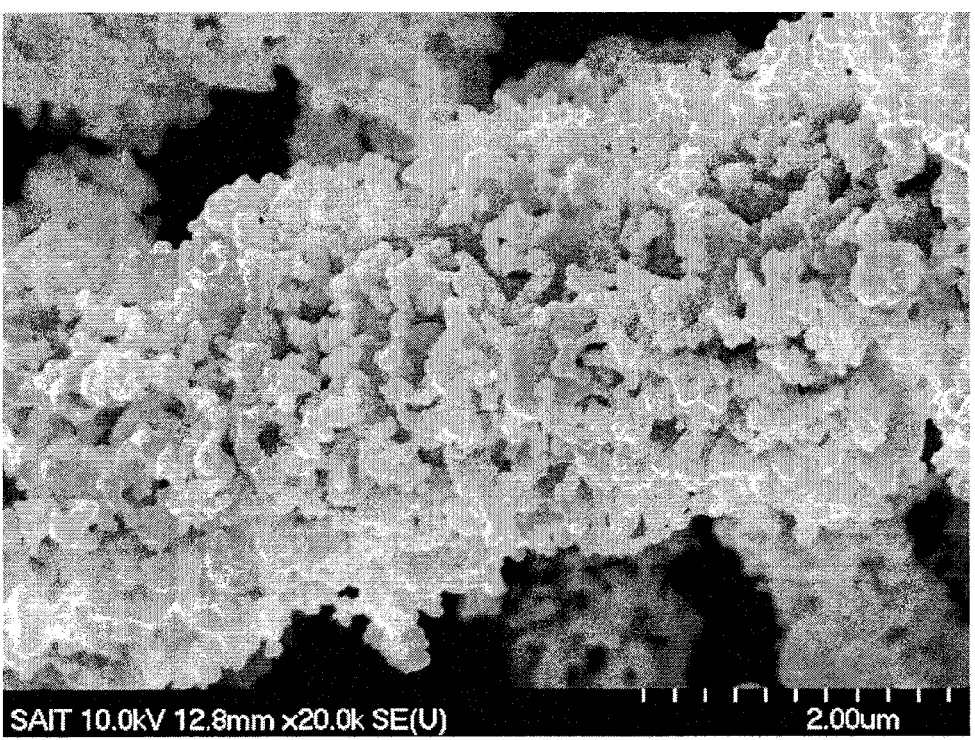

FIGS. 6A and 6B are SEM images of the porous nickel oxide prepared according to Example 2. FIGS. 7A and 7B are SEM images of the porous nickel oxide prepared according to Example 3. FIGS. 8A and 8B are SEM images of the porous nickel oxide prepared according to Example 4. FIGS. 9A and 9B are SEM images of the porous nickel oxide prepared according to Example 5.

These results show that the size of the primary particles and the diameters of the pores increase as the temperature increases from a heat treatment temperature of greater than 800° C.

Figure 10:
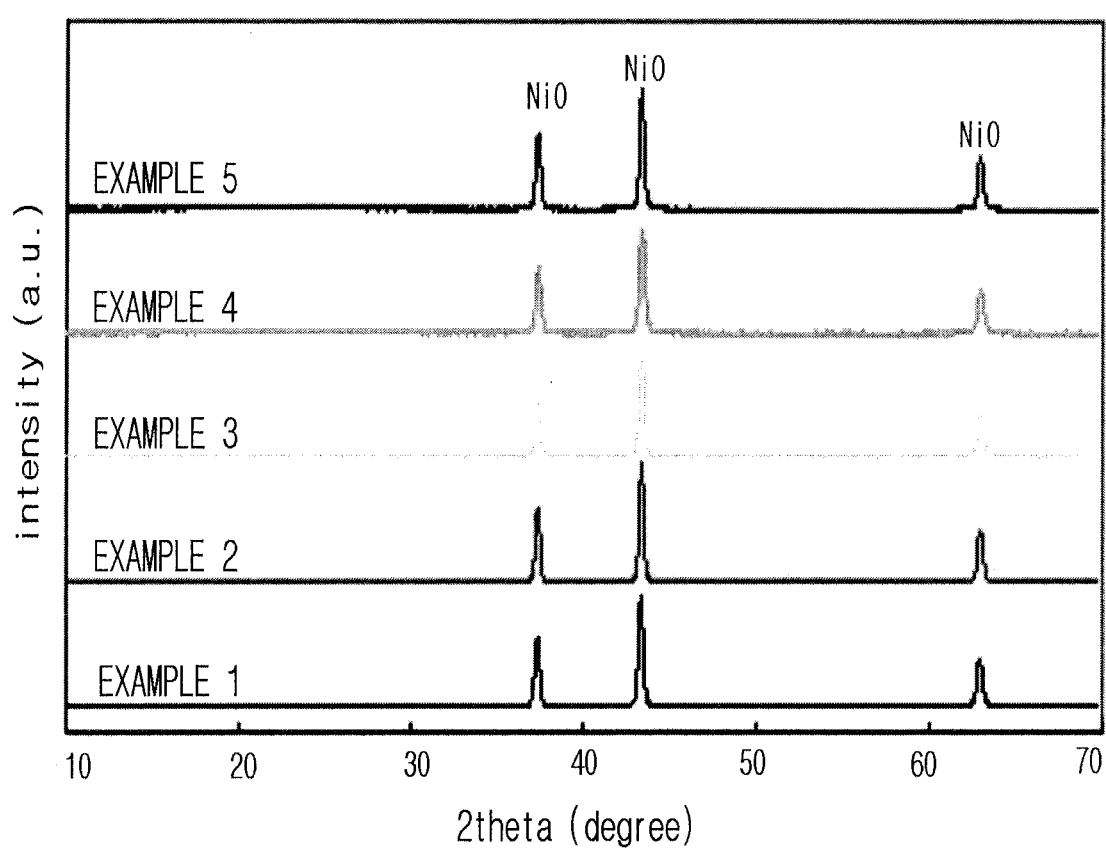
FIG. 10 is an XRD graph of the porous nickel oxide prepared according to Examples 1 through 5.

FIG. 10 is an X-ray diffraction (XRD) graph of the porous nickel oxide prepared according to Examples 1 through 5.

Figure 11:
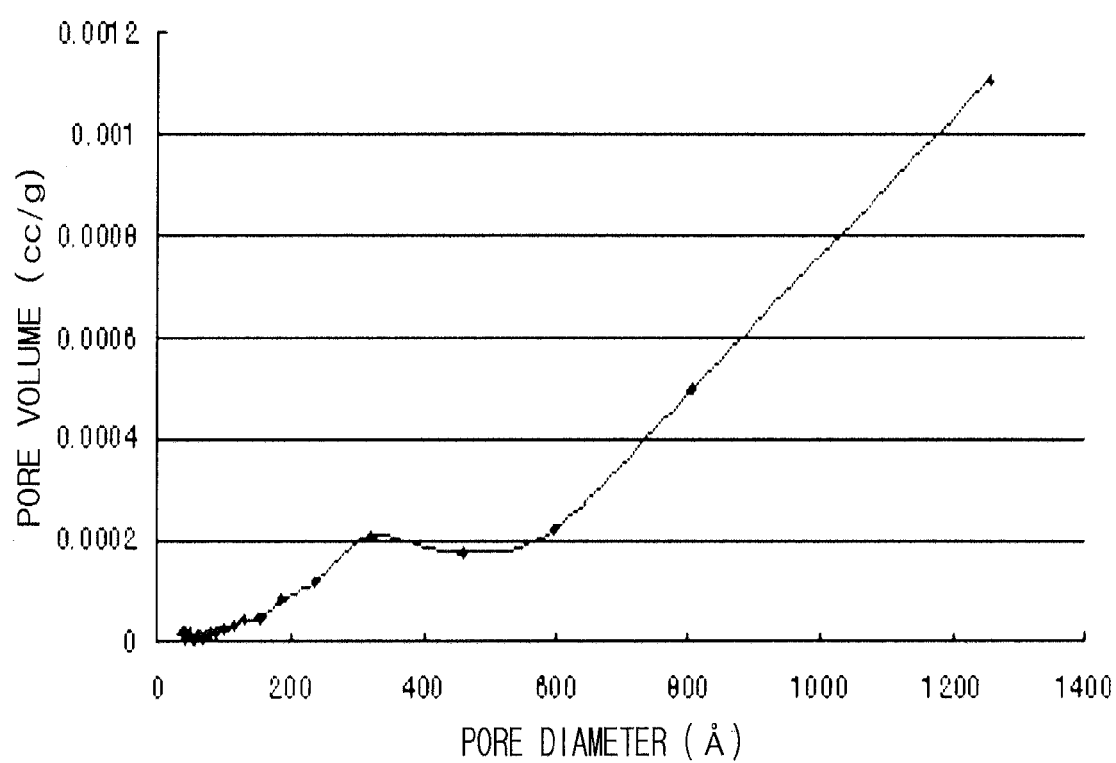
FIG. 11 is a graph illustrating the nitrogen adsorption of the porous nickel oxide prepared according to Example 4.

FIG. 11 is a graph illustrating the nitrogen adsorption of the porous nickel oxide prepared according to Example 4, and indicates that most pores have a diameter of 20 nm or greater.

Example 6

14.93 g of nickel (II) acetate tetrahydrate, 3.73 g of cobalt (II) acetate tetrahydrate, and 9.98 g of trimesic acid were added to 500 ml of distilled water and stirred at 55° C. for 2 hours. Powders produced in the solution were removed using a nylon filter, washed with distilled water several times, and then dried in an oven at 80° C. for 12 hours to obtain a needle-shaped coordination polymer crystal.

Figure 12A:
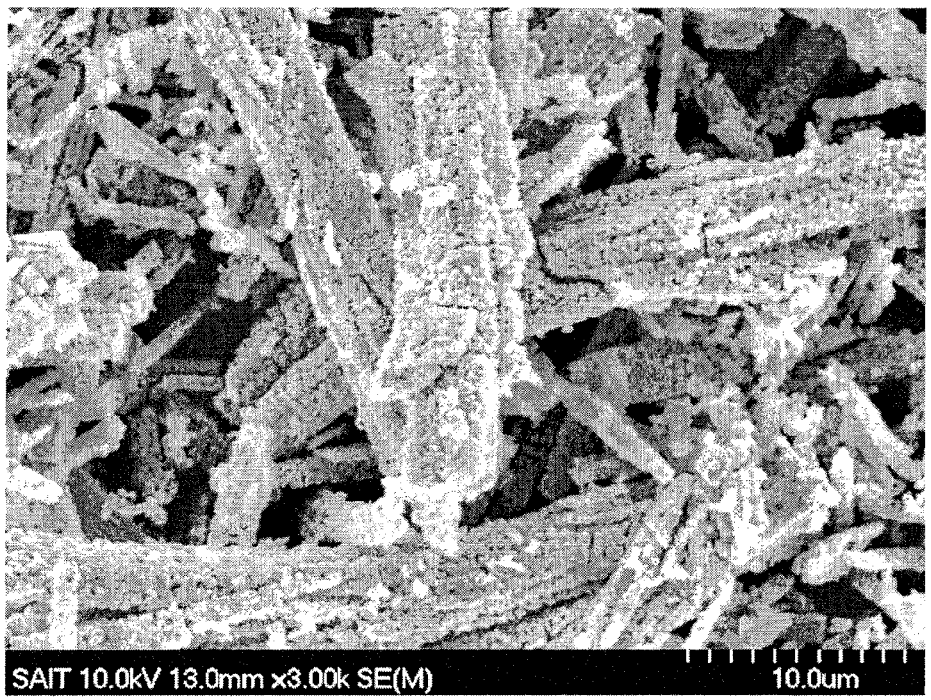
FIGS. 12A and 12B are SEM images of the porous $Ni_{0.8}Co_{0.2}O$ prepared according to Example 6.
Figure 12B:
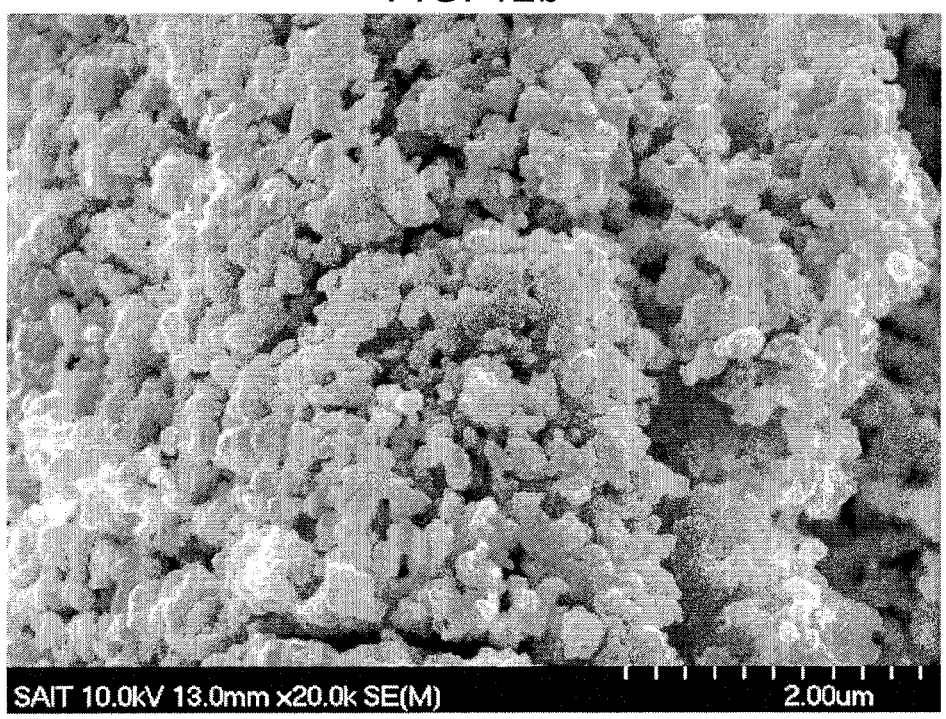

The obtained crystalline coordination polymer was subjected to a heat treatment process under an Ar atmosphere at 900° C. for 1 hour to prepare a carbon-(nickel, cobalt) composite, and then subjected to a heat treatment process at 700° C. for 1 hour to prepare a porous $Ni_{0.8}Co_{0.2}O$ material. FIGS. 12A and 12B are SEM images of the prepared porous $Ni_{0.8}Co_{0.2}O$ material.

Example 7

14.93 g of nickel (II) acetate tetrahydrate, 3.73 g of cobalt (II) acetate tetrahydrate, and 9.98 g of trimesic acid were added to 500 ml of distilled water and stirred at 55° C. for 2 hours. Powders produced in the solution were removed using a nylon filter, washed with distilled water several times, and then dried in an oven at 80° C. for 12 hours to obtain a crystalline coordination polymer.

Figure 13A:
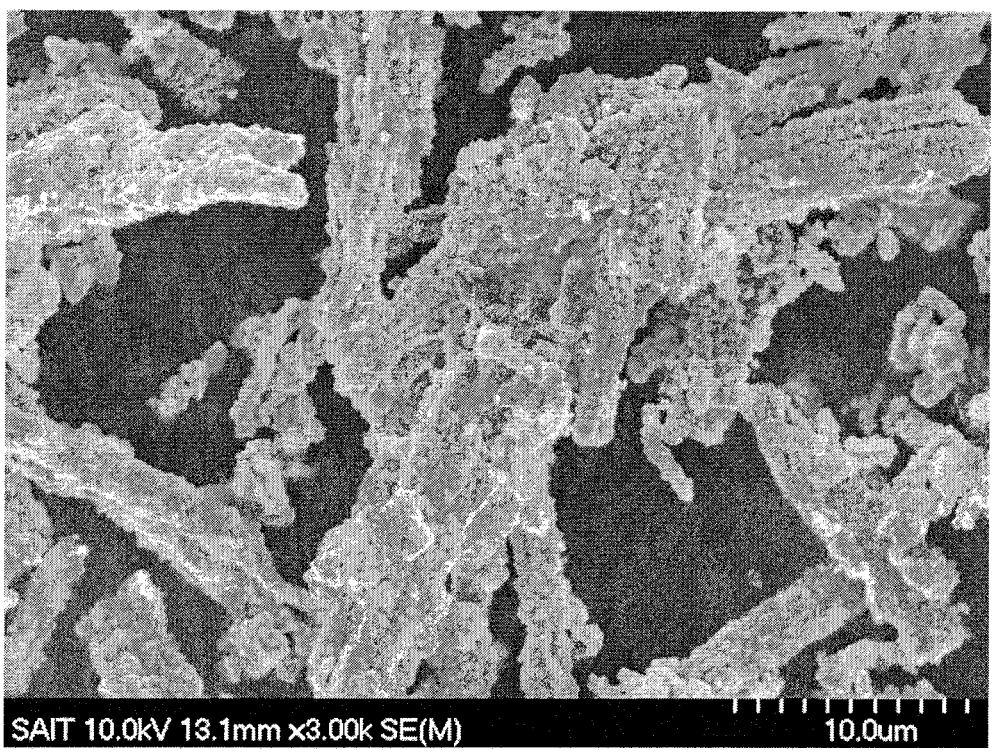
FIGS. 13A and 13B are SEM images of the porous $Ni_{0.8}Co_{0.2}O_2$ prepared according to Example 7.
Figure 13B:
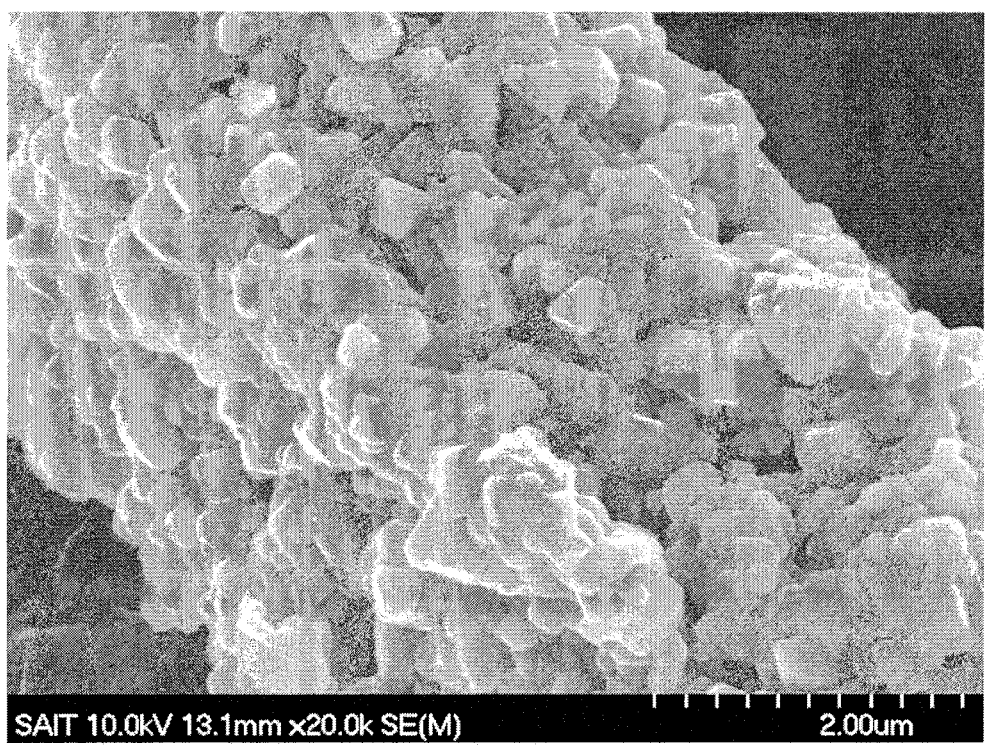

The obtained crystalline coordination polymer was subjected to a heat treatment process under an Ar atmosphere at 900° C. for 1 hour to prepare a carbon-(nickel, cobalt) composite. LiOH was mixed with the prepared carbon-(nickel, cobalt) composite such that the atom ratio of the transition metal and lithium was 1:1 and the mixture was subjected to a heat treatment process at 700° C. for 12 hours. FIGS. 13A and 13B are SEM images of the prepared porous $LiNi_{0.8}Co_{0.2}O_2$ material. The results show that although primary particles were grown during the formation of $LiNi_{0.8}Co_{0.2}O_2$ by reaction with Li, the needle shape of the particles and some of the pores were maintained.

Example 8

Manufacture of Electrochemical Capacitor 93 weight % of the porous nickel oxide prepared according to Example 2, 4 weight % of a conductive carbon material, and 3 weight % of PVDF were dispersed in N-methylpyrrolidone to prepare a slurry. The slurry was coated on aluminum foil to a thickness of 100 um and dried.

A test cell was manufactured by forming a plurality of electrodes from the dried product. Each electrode had a circular shape with a diameter of 13 mm. Two of these electrodes having the same weight were inserted into a CR2016 sized coin cell made of stainless steel and were positioned to overlap and face each other. A separator was placed between the electrodes. Then, 0.6M tetraethylammonium tetrafluoro borate (TEATFB) in propylene carbonate (PC) solution was injected into the test cell as an electrolyte. Here, the separator was a Model 3501 polyethylene membrane available from Celgard, Inc. (Charlotte, N.C.).

Figure 14:
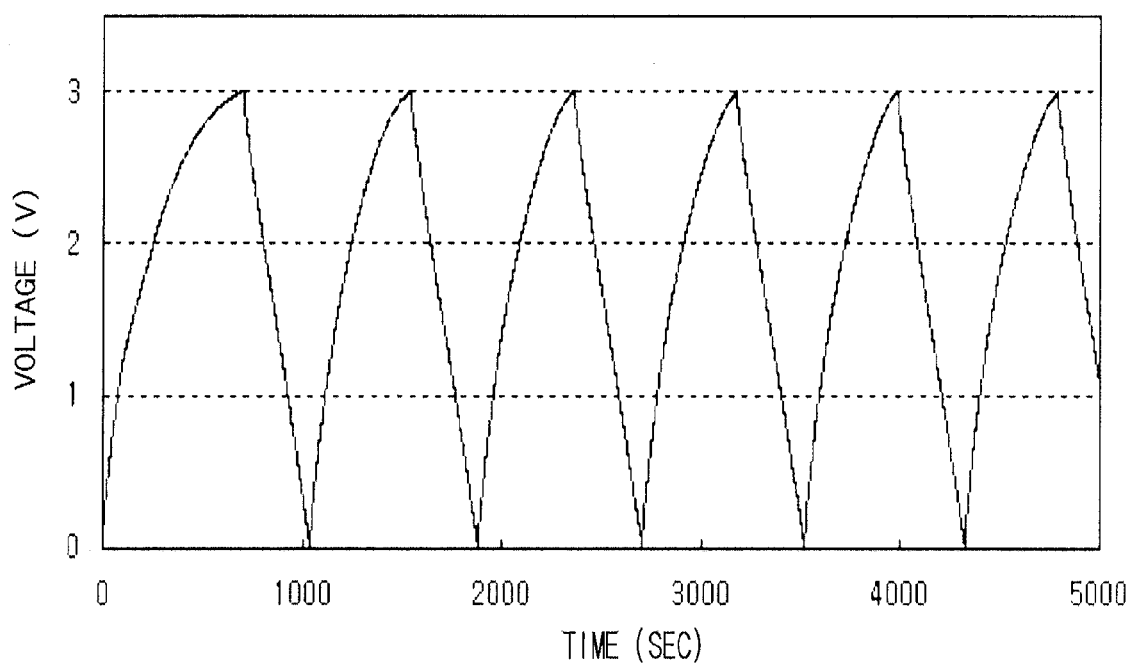
FIG. 14 is a graph illustrating the charge/discharge properties of the cell prepared according to Example 8.

The assembled cell was repeatedly charged and discharged at a current of 0.1 mA to a voltage ranging from 0 to 3.0 V. FIG. 14 is a graph illustrating the initial charge/discharge of the manufactured cell, indicating the characteristics of the capacitor.

Comparative Example

A test cell was manufactured as in Example 8, except that non-porous NiO powder obtained by subjecting nickel (II) acetate tetrahydrate powder to a heat treatment process at 700° C. for 1 hour in air was used instead of the porous NiO powder obtained in Example 2.

Figure 15:
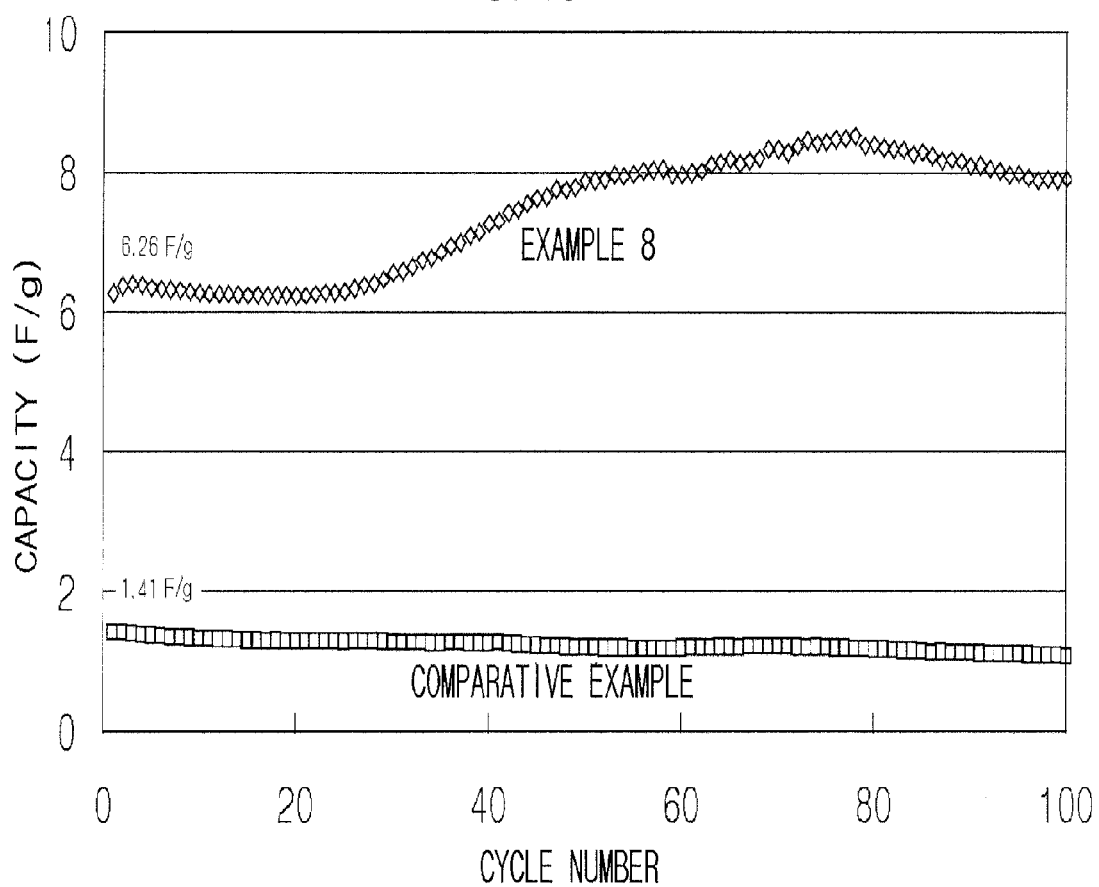
FIG. 15 is a graph illustrating capacitance variation when the cells prepared according to Example 8 and the Comparative Example were charged and discharged 100 times.

FIG. 15 is a graph illustrating capacitance variation of the cells prepared in Example 8 and the Comparative Example after charging and discharging 100 times. As shown in FIG. 15, the initial performance and cycle life of the cell prepared according to Example 8 (including a porous nickel oxide according to an embodiment of the present invention) was better than that of the Comparative Example (in which a nonporous nickel oxide was used as an electrode).

The porous metal oxides according to the present invention are obtained by heat-treating a coordination polymer and can be mass-produced. The shape of the produced porous metal oxides can be easily controlled, and the shape and distribution of the pores of the porous metal oxides can be adjusted to be uniform. Thus, ions or gases can easily flow. Thus, the porous metal oxides of the present invention have excellent high-rate characteristics, and can be used as catalysts, catalyst supports, electrode materials for secondary batteries, fuel cells, or electric double layer capacitors.

While certain exemplary embodiments of the present invention have been described and illustrated, those of ordinary skill in the art will understand that various modifications and changes to the described embodiments can be made without departing from the spirit and scope of the present invention as defined by the following claims.

What is claimed is:

1. A method of preparing a porous metal oxide, comprising heat treating a coordination polymer, the heat treating comprising:
   a first heat treatment process conducted under an inert atmosphere; and
   a second heat treatment process conducted under an oxygen-containing atmosphere, wherein the coordination polymer comprises a compound having a unit structure represented by Formula 1:

$M_xL_yS_z$  Formula 1 wherein M is a metal selected from the group consisting of transition metals, Group 13 metals, Group 14 metals, Group 15 metals, lanthanides, actinides and combinations thereof, L is a multi-dentate ligand capable of forming ionic or covalent bonds with at least two metal ions, S is a mono-dentate ligand capable of forming an ionic or covalent bond with one metal ion, wherein d represents a number of functional groups of L capable of binding to a metal ion, wherein x, y and z are integers satisfying Equation 1:

$yd+z \leq 6x$  Equation 1 and wherein the multi-dentate ligand is selected from the group consisting of trimesate-based ligands represented by Formula 4, terephthalate-based ligands represented by Formula 5, 4,4'-bipyridine-based ligands represented by Formula 6, 2,6-naphthalenedicarboxylate-based ligands represented by Formula 7, pyrazine-based ligands represented by Formula 8 and combinations thereof:

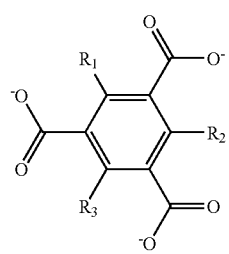

Formula 4

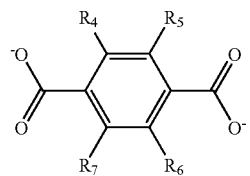

Formula 5

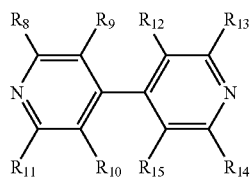

Formula 6

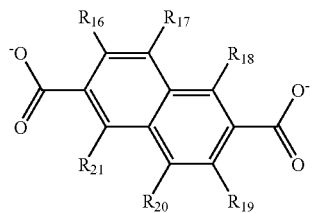

Formula 7

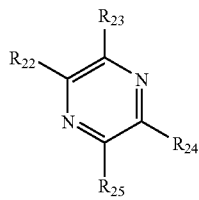

Formula 8 wherein $R_1$ to $R_{25}$ are each independently selected from the group consisting of hydrogen atoms, halogen atoms, hydroxy groups, substituted $C_{1-20}$ alkyl groups, unsubstituted $C_{1-20}$ alkyl groups, substituted $C_{1-20}$ alkoxy groups, unsubstituted $C_{1-20}$ alkoxy groups, substituted $C_{2-20}$ alkenyl groups, unsubstituted $C_{2-20}$ alkenyl groups, substituted $C_{6-30}$ aryl groups, unsubstituted $C_{6-30}$ aryl groups, substituted $C_{6-30}$ aryloxy groups, unsubstituted $C_{6-30}$ aryloxy groups, substituted $C_{2-30}$ heteroaryl groups, unsubstituted $C_{2-30}$ heteroaryl groups, substituted $C_{2-30}$ heteroaryloxy groups, unsubstituted $C_{2-30}$ heteroaryloxy groups and combinations thereof.

2. The method of claim 1, wherein the first heat treatment process is conducted at a temperature ranging from about 300° C. to about a melting point of a metal included in the coordination polymer.

3. The method of claim 1, wherein the second heat treatment process is conducted at a temperature ranging from about 300 to about 1500° C.

4. The method of claim 1, wherein the coordination polymer forms a network by connecting metal ions with the multi-dentate ligand.

5. The method of claim 1, wherein the metal is selected from the group consisting of Fe, Pt, Co, Cd, Cu, Ti, V, Cr, Mn, Ni, Ag, Pd, Ru, Mo, Zr, Nb, La, In, Sn, Pb, Bi and combinations thereof.

* * * * *